United States Patent [19]

Sud

[11] Patent Number: 4,568,060
[45] Date of Patent: Feb. 4, 1986

[54] SHOWER INSTALLATION AND VALVE THEREFORE

[76] Inventor: Mohinder P. Sud, 46 Portland Crescent, Newmarket, Ontario, Canada, L3Y 6A6

[21] Appl. No.: 372,066

[22] Filed: Apr. 26, 1982

[51] Int. Cl.$^4$ .................................. F16K 31/524
[52] U.S. Cl. ........................ 251/229; 74/25; 74/55; 74/116; 251/230; 251/251
[58] Field of Search .......... 251/229, 230, 251, 309, 251/312; 74/25, 55, 56, 57, 111, 116

[56] References Cited

U.S. PATENT DOCUMENTS

| | | | |
|---|---|---|---|
| Re. 13,552 | 4/1913 | Humphrey | 251/230 |
| 1,028,374 | 6/1912 | McGuire | 251/251 |
| 1,095,209 | 5/1914 | Humphrey | 251/230 |
| 1,095,295 | 5/1914 | Stevens | 251/230 |
| 1,140,026 | 5/1915 | Elser | 251/230 |
| 1,169,195 | 1/1916 | Rosengren | 251/230 |
| 1,519,157 | 12/1924 | Muller | 251/230 |
| 1,631,109 | 5/1927 | Hitzemann | 251/229 |
| 2,225,541 | 12/1940 | Werner | 251/251 |
| 2,426,779 | 9/1947 | MacDonald | 137/865 |
| 2,641,280 | 6/1953 | Fleischhauer | 251/230 |
| 2,744,541 | 5/1956 | Fleischhauer | 251/230 |
| 2,935,198 | 5/1960 | Kryzer et al. | 210/138 |
| 2,965,134 | 12/1960 | Pouppirt, Jr. | 137/624.18 |
| 3,220,695 | 11/1965 | Downey et al. | 251/230 |
| 3,333,815 | 8/1967 | Downey et al. | 251/230 |
| 3,428,085 | 2/1969 | Haberstump | 137/624.2 |
| 3,480,034 | 11/1969 | Jerome | 251/230 |
| 3,768,775 | 10/1973 | Archer | 251/230 |
| 3,960,364 | 6/1976 | Hargrave | 251/210 |
| 4,014,512 | 3/1977 | Cheever et al. | 251/309 |
| 4,044,996 | 8/1977 | Kodaira | 251/251 |
| 4,116,216 | 9/1978 | Rosenberg | 251/230 |
| 4,262,880 | 4/1981 | Danko et al. | 251/309 |

FOREIGN PATENT DOCUMENTS 1018536 1/1953 France .................... 251/229

*Primary Examiner*—George L. Walton
*Attorney, Agent, or Firm*—Hirons, Rogers & Scott

[57] ABSTRACT

A valve for use in a domestic water installation such as a shower is moveable between open and closed positions by an operating mechanism. The mechanism includes a ratchet that provides intermittent unidirectional drive to the valve member from a manual operator. Successive repetitive movements of the operator moves the valve between open and closed positions. The valve includes a seat and a poppet the disposition of which is controlled by cams that ensure that pressure of water in the conduit assists in moving the valve between open and closed positions.

13 Claims, 8 Drawing Figures

SHOWER INSTALLATION AND VALVE THEREFORE

The present invention relates to valves and in particular to valves suitable for installation on domestic water systems such as showers.

It is usual in the installation of a shower that hot and cold water is fed through a faucet to a single outlet connected to a showerhead. The temperature of the water is adjusted by regulating the flow from the hot and cold water supply by means of respective valves provided on the faucet. This arrangement is extremely convenient but does not have the limitation that if the flow of water to the showerhead needs to be terminated temporarily it is necessary to turn off the hot and cold water valves. It is then necessary to re-adjust these valves to obtain the desired temperature of the water when the shower is continued. This is of course generally inconvenient.

It has been proposed to utilise a valve in the showerhead to interrupt flow. Whilst more convenient these valves have been operable by means of push buttons or butterfly nuts. Located on the showerhead. This renders operation of the valve inconvenient and somewhat awkward as the location of the valve operator has to be determined precisely and a relatively small area grasped with wet hands to operate the valve. A further problem associated with such arrangements is that the valve must be operated against the pressure of water in the water supply. This increases the forces acting in the valve and makes operation difficult.

Accordingly, it is an object of the present invention to provide a valve and an installation in which the above disadvantages are obviated or mitigated.

According therefore to the present invention there is provided: A domestic water installation comprising a supply of hot water, a supply of cold water, a faucet to control the supply of hot and cold water and deliver a mixture thereof to a single outlet, a conduit connected to said outlet to convey mixed water to a shower head connected to said conduit and a valve controlling flow through said conduit and operable in either an open position in which flow to the showerhead is permitted or a closed position in which such flow is prevented, said valve including a valve member and an operating mechanism to move said valve member between said open and closed positions and said operating mechanism having an intermittent unidirectional drive between a manual operator and said valve member whereby successive repetitive movement of said operator moves said member alternately to said open and closed positions. Embodiments of the invention will now be described by way of example only with reference to the accompanying drawings in which Embodiments of the invention will now be described by way of example only with reference to the accompanying drawings in which, FIG. 1 is a diagramatic illustration of a domestic shower installation FIG. 2 is a sectional view through a valve shown in FIG. 1

Figure 1:
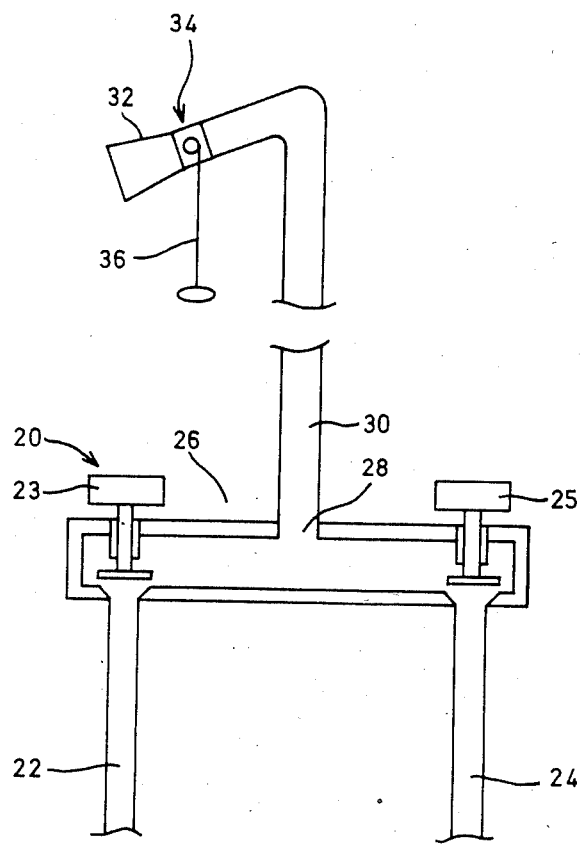

Referring now to FIG. 1, a shower installation generally designated 20 includes a hot water supply 22 and a cold water supply 24. The supplies 22–24 are connected to a faucet 26 of known construction which regulates the flow from each of the supplies 22–24 to a single outlet 28 by respective valves 23, 25. By adjusting the flow through the respective valves 23, 25 the temperature of the water at the outlet 28 may be adjusted.

A conduit 30 is connected to the outlet 28 and extends vertically to support a showerhead 32 at an elevated location. A valve generally designated 34 is connected in the conduit 30 between the outlet 28 and the showerhead 32 and may be adjusted to one of two positions, namely an open position in which flow through the conduit to the showerhead occurs and a closed position in which such flow is prevented. Operation of the valve 34 is achieved through an operator 36 in the form of a flexible chain with a handle at one end of the chain.

Details of the valve 34 may best be seen in FIGS. 2 through 6. The valve 34 includes a body 38 having a passageway 40 extending therethrough between an inlet 42 and an outlet 44. The passageway 40 is threaded at the inlet 42 to receive the threaded end of the conduit 30 and the body 38 is threaded adjacent the outlet 44 to receive the showerhead 32.

A valve seat 46 is slidably received in the passageway 40 to move toward and away from the inlet 42. The valve seat 46 is in the form of an annular sleeve 47 having a shoulder 48 at one end on its external surface 49 and rebate 52 at the opposite end on its internal surface 51. The external surface 49 abuts an o-ring 50 located on a shoulder 53 in the passageway 40 to provide a seal between the valve seat and the passageway 40.

A valve member 54 is received within the valve seat 46 and is in the form of a poppet having a head 56 connected to a stem 58. The stem 58 terminates in a hemispherical button 94. The valve member 54 is supported in the valve seat 46 by means of four circumferentially spaced fins 60 which slidingly engage the internal surface 51 of the valve seat 46. The portion of the fin 60 adjacent the head 56 is recessed to receive an o-ring 62 which may be moved into engagement with the valve seat 46 to seal between the valve seat 46 and the head 56.

The end of each of the fins 60 adjacent the button 94 has a downwardly projecting tang 64 with a radially extending barb 66 at one end. The tangs 64 are slightly resilient and deflect during insertion of the valve member 54 into the valve seat to allow the barbs 66 to enter the rebate 52 and retain the valve seat within the valve member. The spacing of the barbs 66 from the head 56 is chosen to permit limited longitudinal movement of the valve member 54 relative to the valve seat 46 and allow the o-ring 62 to move into and out of engagement with the valve seat 46.

The disposition of the valve seat and valve member within the passageway 40 is controlled by a valve operating mechanism 68. The operating mechanism 68 includes a spindle 70 located in a transverse bore 72 intersecting the passageway 40. The spindle 70 includes two pairs of lands 74–76 at spaced locations that receive o-rings 78–80 to provide a seal between the spindle 70 and the bore 72. Located between the lands 74–76 are two identical cams 82 that engage the valve seat 46 at diametrically opposed locations and a cam 84 located between the cams 82 and in engagement with the valve member 54. The cams 82 are generally elliptical with the points of minimum and maximum eccentricity displaced at 90 degrees to one another. The profile of cams 82 progressively increases from a minimum radius of a point designated 83 to a maximum at the point indicated 85. The profile maintains a constant radius from the point 85 to a point 87 from where it gradually decreases to a minimum radius. The cam 82 includes two identical cams spaced apart on the spindle 70 so as to engage diametrically opposed portions of the valve seat 46. The cam 84 is formed with two diametrically opposed lobes 86–88. Each lobe has a convex surface 90 of progressively increasing radius over an arc of approximately 90 degrees that is intersected by a concave surface 92 to provide a rapid transition to the minimum radius of the cam 84. The cam 84 engages with the button 94 and the contour of the concave surface 92 is chosen to correspond to the button 94.

The maximum diameter of the cam 84 is located at the intersection of the convex and coincave surfaces 90, 92 and is orientated to coincide with the start of the constant radius curve of the cam 82, as designated 83.

The spindle 70 is rotated by a ratchet mechanism 96 that includes an annular boss 98 having an arm 100 to which the chain 36 may be attached. The boss 98 is formed with a central bore 106 and a counterbore 102 on the internal surface 104 of which are formed four ramps 104. Each of the ramps has a circumferential surface 105 and a radial end face 107. The spindle 70 is formed with an enlarged head 108 and extends through a central bore 106 in the boss 98. A radially extending hole 110 is formed in the head 108 and receives a compression spring 112 and a dog 114. The dog 114 is biased by the spring 112 into engagement with the internal surface 103 of the counterbore 102 so that the ramps 104 and dog 114 co-operate to provide an intermittent unidirectional drive between the boss 98 and the spindle 70. A torsion spring 116 encompasses the spindle 70 and extends between the boss 98 and the body 38. The ratchet mechanism provided between the boss and the spindle permits oscillating movement of the boss 98 about the spindle 70 to be translated into a unidirectional stepped rotation of the spindle 70 relative to the body 38.

Relative movement between the body 38 and boss 98 is limited to an arc slightly greater than 90 degrees by means of a radially inwardly directed peg 117 on the internal surface of the boss 98 that slides in a rebate 119 formed on the body 38.

The spindle 70 is retained within the bore 72 by means of an end cap 118 which has a circumferential lip 120 engaging a circumferential groove 122 formed at the end of the spindle. This enables the spindle and boss to be assembled onto the valve by inserting the spindle in the bore 72 and securing it by means of the end cap 118.

Figure 2:
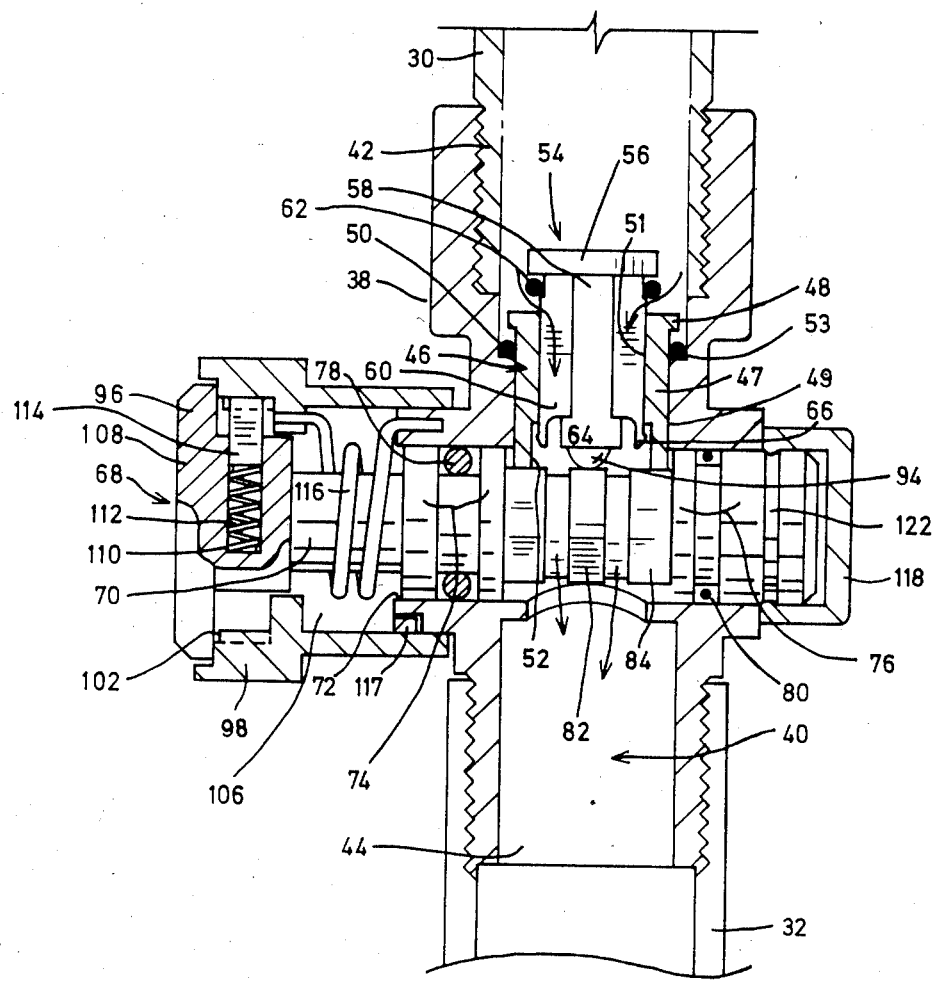

The operation of the valve 34 will be described assuming that it is initially in the position indicated in FIG. 2. In this position water supplied to the outlet 28 flows through the conduit 30 and through the annular gap between the head 56 and the valve seat 46. The water may then flow between the fins 60 and along the passageway 40 to the outlet 44.

Figure 3:
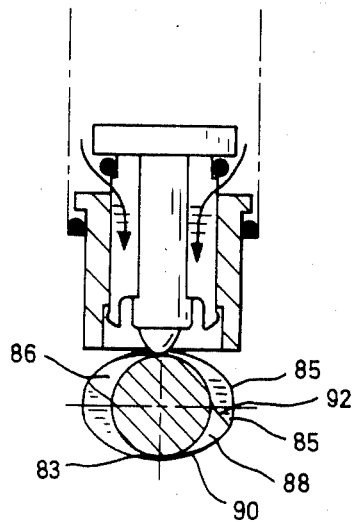
FIGS. 3, 4 and 5 are detailed views showing the alternative positions of components of the valve shown in FIG. 2
Figure 4:
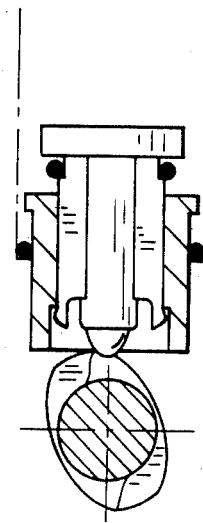
Figure 5:
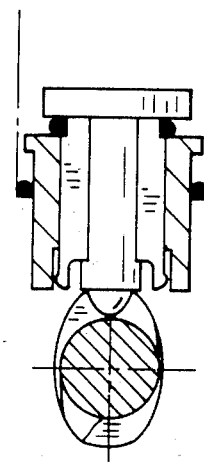
Figure 6:
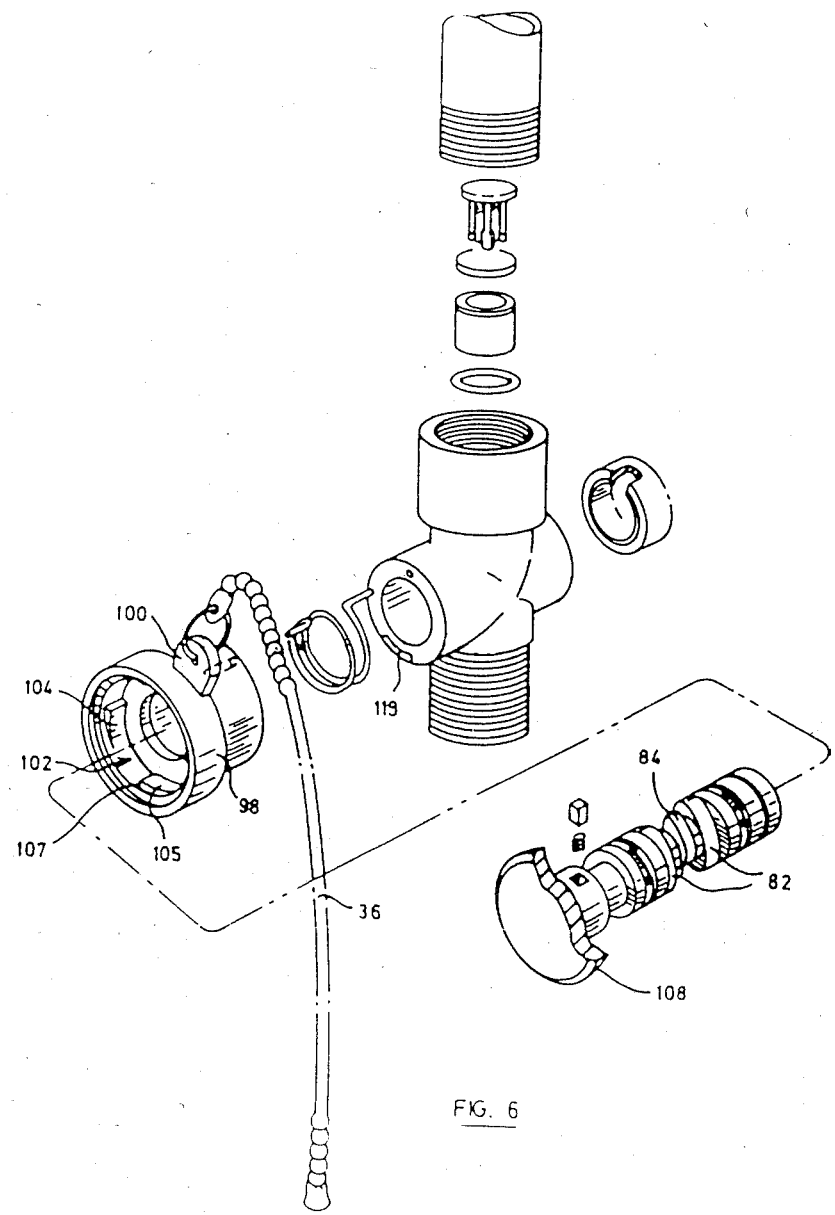
FIG. 6 is an exploded perspective view showing the components of the valve shown in FIG. 2.

If it is desired to interupt the flow a downward vertical force is applied to the operator 36 to rotate the boss 98 relative to the body 38 and bring the radial faces 107 of the ramps 104 into engagement with the dog 114. Further rotation of the boss 98 causes corresponding rotation of the spindle 70 in the bore 72 which thereby rotates the cams 82–84. In the position shown in FIG. 2 the valve seat 46 and valve member 54 are both engaged with the cam surfaces 82–84 at the minimum diameter of these surfaces as shown in FIG. 3. Rotation of the cams 82–84 causes the valve seat 46 and valve member 54 to move along the progressively increasing surfaces of the cams 82–84 and displace conjointly both the valve seat 46 and the valve member 54 along the passageway 40 towards the inlet 42. The maximum diameter of each cam is reached after approximately 75 degrees rotation of the spindle 70 as shown in FIG. 4. Continued rotation of the spindle 70 moves the valve seat 46 on to the portion of the cam 84 of constant diameter and the valve member 54 past the intersection of surfaces 90–92. The valve seat 46 is thus maintained in position within the passageway 40. Whereas the valve member 59 moves relative to the valve seat 46 towards the outlet 44. This movement of the valve member towards the valve seat 46 is induced by the flow of fluid in the conduit 30.passing through the valve seat 46 and creating a pressure drop across the valve member 54. After the spindle 70 has rotated 90 degrees from the position shown in FIG. 2 and FIG. 3, the o-ring 62 is in engagement with the valve seat 46 and prevents any further flow of water through the passageway 40. The operator 36 is then released and the boss 98 rotates relative to the body under the influence of the torsion spring 112. The circumferential surfaces 105 of ramps 104 move the dog 114 radially inwardly against the compression spring 112 and allow the boss to return to the position in which the dog is facing a radial surface 107 of the next ramp 104. Rotation of the spindle 70 within the bore 72 with the boss 98 is prevented by the engagement of the button 94 with the concave surface 92 so that the valve is maitained in a closed position.

The valve may be re-opened by repeating the above sequence by pulling the operator 36 to rotate the spindle 70 a further 90 degrees. The convex surface 90 of the cam 82 maintains the valve member 54 stationary within the passageway 40 whereas the surface of the cam 82 permits the valve seat 46 to move toward the outlet 44 of the passageway 40. This moves the o-ring 62 out of engagement with the valve seat and once again permits flow of fluid in the valve seat and the valve member. The displacement of the valve seat within the passageway is once again induced by the application of pressure from the fluid in the conduit 30.

It will be apparent from the above description that the valve 34 allows the flow through the conduit 30 to be interrupted and commenced by a simple repetitive movement of the operator 36. The operator 36 is conveniently located for manipulation by the user of the shower and provides components of sufficient size to permit easy operation under most conditions. Further interruption of the flow of water does not affect the mix of hot and cold supplies delivered to the outlet. The configuration of the cams 82–84 ensures that the valve seat and valve member are not required to move against water pressure to open or close the valve and thereby decreases the forces required to move the valve between open and closed positions.

Figure 7:
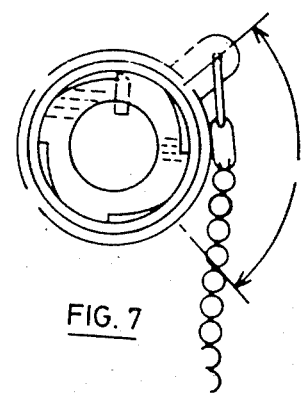
FIG. 7 is an end view showing details of the drive connection used on the valve.
Figure 8:
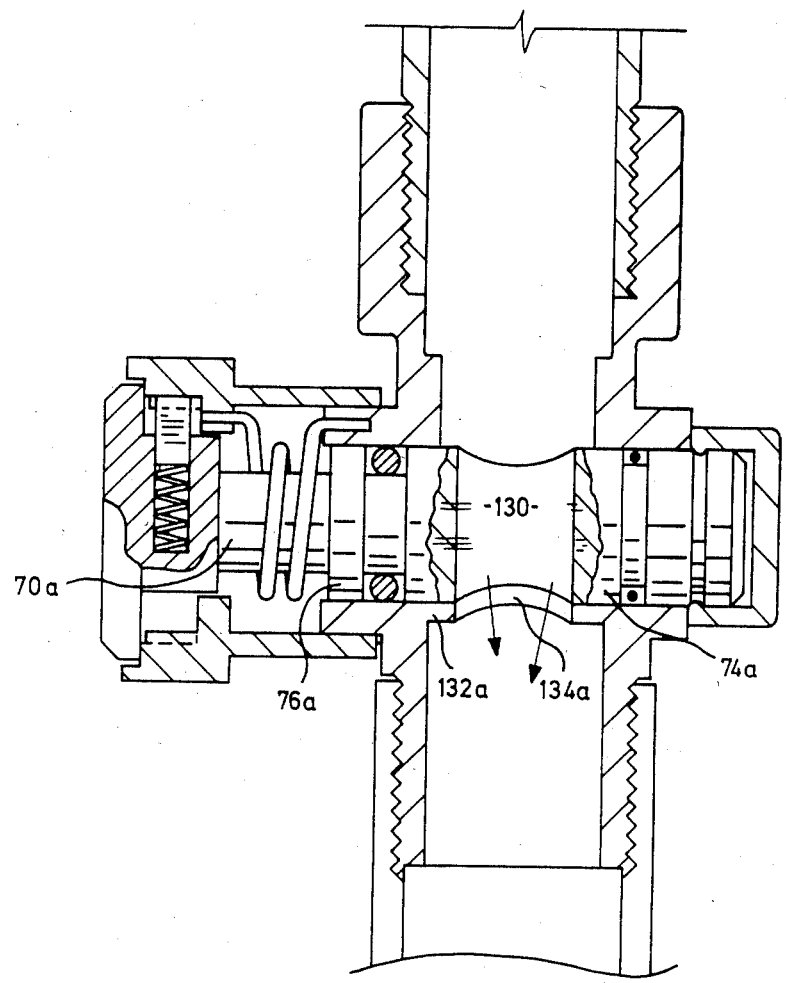
FIG. 8 is a cross sectional view similar to FIG. 2 of an alternative embodiment of valve.

An alternative arrangement of valve is shown in FIG. 7 wherein the valve and seat member is replaced with a simple spindle and aperture. The details of the valve are similar in other respects to the embodiments shown in FIGS. 2 to 6 and like reference numerals are used to designate like components with suffix "a" added for clarity. The details of the operating mechanism are similar and will not be described in detail.

The spindle 70a is of constant diameter between the lands 74a 76a and has a bore 130a extending diametrically therethrough. A wall 132a extends across the passageway 40a below the bore 72a and has an aperture 134a corresponding to the bore 130a. The aligning bore 130a and aperture 134a, the passageway 40a is opened for flow. Movement of the operator 36a induces a 90 degrees rotation of the spindle 70a to move the bore 130a and aperture 134a out of alignment and closes the passageway 40a to flow.

It will be apparent that in this embodiment successive movement of the operator 36 induces 90 degrees rotation of the sppindle 70a alternatively to open and close the valve 34a.

The valve has been shown as a separate component but it will be apparent that it could be incorporated into a showerhead as an integral unit.

I claim:

1. A valve for controlling flow of fluid through a conduit, said valve comprising a body having an inlet, an outlet and a passageway connecting said inlet and outlet, a valve seat located in said passageway and moveable relative to said body, a valve member engagable with said valve seat to provide a closed position of said valve in which flow of fluid through the passageway is inhibited and moveable out of engagement with said valve seat to an open position to permit flow through the passageway, operating member to control the disposition of said valve member and said seat in said body, said operating member moving from a first through a second to a third position while moving the valve between the open and closed positions, movement from the first to the second position conjointly displacing the valve member and valve seat relative to the valve body to maintain the seat and member in spaced relationship and movement through the second position to the third position permitting relative movement between the valve member and seat under the influence of the pressure of the liquid to attain the closed position of the valve.

2. A valve according to claim 1 wherein said valve member and seat are conjointly displaced in moving from said open to said closed position.

3. A valve according to claim 2 wherein said operating member conjointly displaces said valve member and valve seat in said passageway toward said inlet.

4. A valve according to claim 3 wherein said operating member includes a plurality of cam surface operating upon respective ones of said valve member and valve seat.

5. A valve according to claim 4 wherein said operating member is rotatable in said body.

6. A valve according to claim 5 wherein rotation of said operating member is induced by a lever connected thereto.

7. A valve according to claim 6 wherein said lever is connected to said operating member by a ratchet mechanism whereby successive oscillating movements of said lever causes unindirectional movement of said operating mechanism.

8. A valve for controlling flow of fluid, said valve comprising a body, having a passageway extending from a inlet to an outlet, a valve seat located in said passageway and slidable along said passageway relative to said body, a valve member engagable with said valve seat to prevent flow of fluid through said passageway and a valve operating member operable upon said valve seat and said valve member to move said valve member out of engagement with said seat to permit flow through said passage, said operating member being operable to move from a first through a second to a third position while moving the valve between the open and closed positions, movement from the first to the second position displacing conjointly said valve seat and valve member along said passageway toward said inlet prior to movement through said second position to said third position in which valve member moves into engagement with said seat whereby flow of fluid in said passageway from said inlet to said outlet assists movement of said valve member toward said valve seat.

9. A valve according to claim 8 wherein said operating member causes displacement of said valve seat relative to said valve member and toward said outlet to move said seat and member to an open position and permit fluid to flow through said passageway.

10. A valve according to claim 9 wherein said operating member is rotatably mounted in said body and includes a first cam member to support said sleeve in said passageway and a second cam member to support said valve member in said passageway.

11. A valve according to claim 10 wherein rotation of said valve member is induced by an operating lever connected to said member by a ratchet device whereby oscilllating movement of said lever induces intermittent unindirectional rotation of said operating member.

12. A valve comprising a body, a passageway extending through said body from an inlet to an outlet, a valve seat located in said passageway and slidable relative thereto, a valve member movably mounted in said passageway and engagable with said seat to prevent flow through the passageway, and an operating member operable upon said valve member and valve seat to cause relative movement therebetween and move said valve from an open position in which flow through said passageway is permitted to a closed position in which such flow is inhibited, said operating member including cam means engagable with said valve member and valve seat and operable to move said valve seat toward said outlet whilst maintaining said valve member stationary in said passageway thereby to move said valve from a closed to an open position and operable to cause said valve member to move toward said outlet whilst maintaining said valve seat stationary in said passageway thereby to move said valve from said open position to said closed position, said cam means inducing conjoint displacement of said valve seat and said valve member in said passageway toward said inlet prior to causing relative movement between said valve member and seat to said closed position whereby fluid flowing in said passageway assists in opening and closing of said valve.

13. A valve according to claim 12 wherein said operatig member induces conjoint displacement of said valve seat and said valve member in said passageway toward said inlet prior to causing movement thereof to said closed position.

* * * * *